United States Patent [19]
Chung et al.

[11] Patent Number: 5,239,597
[45] Date of Patent: Aug. 24, 1993

[54] NEAREST NEIGHBOR DITHER IMAGE PROCESSING CIRCUIT

[75] Inventors: Ho-sun Chung; Ji-hwan Yeo, both of Taegu, Rep. of Korea

[73] Assignee: Samsung Electronics Co., Ltd., Suwon, Rep. of Korea

[21] Appl. No.: 659,972

[22] Filed: Feb. 25, 1991

[51] Int. Cl.5 .............................................. G06K 9/62
[52] U.S. Cl. ...................................... 382/54; 382/14; 358/457; 395/22; 395/24
[58] Field of Search ..................... 382/14, 50, 51, 54; 358/455, 456, 457; 395/22, 24

[56] References Cited

U.S. PATENT DOCUMENTS

| | | | |
|---|---|---|---|
| 4,783,838 | 11/1988 | Matsunawa | 382/51 |
| 4,829,587 | 5/1989 | Glazer et al. | 382/47 |
| 4,926,268 | 5/1990 | Kawamura et al. | 358/458 |
| 4,933,776 | 6/1990 | Ikeda | 358/456 |

Primary Examiner—David K. Moore
Assistant Examiner—Andrew W. Johns
Attorney, Agent, or Firm—Cushman, Darby & Cushman

[57] ABSTRACT

A conversion circuit of binary dither image to multi-level image comprises a counter utilizing concepts of a neural network, an 8 bit register and 8 OR gates, resulting in high speed of operation. The counter uses a neural network based on the Hopfield model and is made up of an input synapse group, a first bias synapse group, a feedback synapse group, a second bias synapse group, a neuron group and an invertor group.

10 Claims, 4 Drawing Sheets

FIG. 2
|   |   |   |
|---|---|---|
| 1 | 2 | 3 |
| 4 | 5 | 6 |
| 7 | 8 | 9 |
FIG. 3a
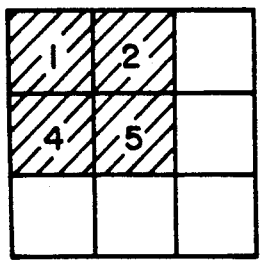
FIG. 3b
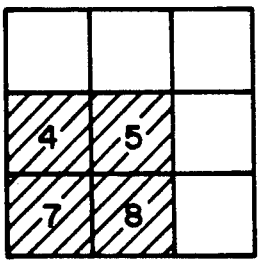
FIG. 3c
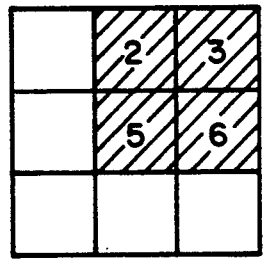
FIG. 3d
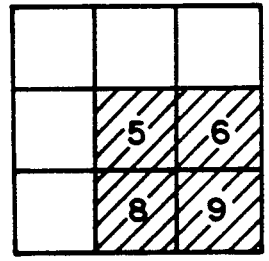
FIG. 4
|   |   |   |
|---|---|---|
| 1 | 2 | 1 |
| 2 | 4 | 2 |
| 1 | 2 | 1 |

NEAREST NEIGHBOR DITHER IMAGE PROCESSING CIRCUIT

BACKGROUND OF THE INVENTION

1. The field of the art

The present invention relates to a circuit for converting a binary dither image to a multilevel image.

2. The background of the art

International standardization for step by step transmission is governed at the present time by the CCITT (Comite Consultatif International pour Telegraphie et Telephonie) and the ISO (International Standards Organization).

A method for realizing step by step transmission of a multilevel image was described in 1987 by Kim, Kato, and Sita in "A step by step transmission of an intermediate tone image using a binary value assumption of multilevel image" Electronics Information & Communication Society Journal. This article describes a method of dither processing an original image to obtain a dither image.

In this process, tone information is obtained using the dither image and forming a multilevel image from the dither image. The multilevel image is compared to the original signal to obtain a difference signal indicating one of many grey levels between absolute white and absolute black. Thus, the transmission of the difference signal and the dither image allows transmission of a overall data signal of much smaller size and equivalent high quality than a comparable signal transmission not using a dither image process.

As shown in FIG. 1, an original image is dither-processed and transmitted. This dither image is also converted into a multilevel image and a difference between the multilevel image and the original image is encoded and transmitted. On the receiving side, the multilevel image is reproduced using the same algorithm as on the sending side. The reconstructed difference component and the reconstructed multilevel image are then summed to reproduce the original image.

This method is problematical because the software processing techniques to implement the above-mentioned conversion method are slow.

SUMMARY OF THE INVENTION

It is an object of the present invention to improve conversion techniques by utilizing neural network concepts with very fast processing speeds. This approach overcomes the problem of slow speeds associated with software conversion techniques.

To accomplish the objective, a circuit is provided to convert a binary dither image to multilevel image. The conversion circuit includes a counter for counting the number of 1's in nine dither pixels within a 3×3 window. In a preferred embodiment, this counter counts four 1's when a value of a center pixel is 1, two 1's when a value of a tetra-directional (horizontal or vertical direction from the center) pixel is 1, and one 1 when a value of an octa-directional (diagonal from the center) pixel is 1, and then outputs the counted value.

The conversion circuit also includes an 8-bit register that inputs the 4 LSBs from the 1's counter into its upper four bits. The lower 4-bits of the 8-bit register are tied to 0000.

Eight OR gates are provided for summing logically the 8-bit output of the register with the MSB output of the 1's counter.

Using these components a multiimage value of the center pixel is obtained and can be transmitted.

The counter is comprised of PMOS and NMOS transistors and utilizes the concepts of neural networks.

BRIEF DESCRIPTION OF THE DRAWING

The foregoing objects features an advantage is the present invention will be described in greater detail and other objects, features and advantages will be made apparent from the detailed description of the preferred embodiment, which is given with reference to the various figures of the drawings, in which:

FIG. 2 is a diagram of a 3×3 window;

FIG. 3 is a diagram of each sub-window within a 3×3 window;

FIG. 4 shows the number of times a 1 in each pixel within a 3×3 window is summed;

DETAILED DESCRIPTION OF THE PREFERRED EMBODIMENT

A preferred embodiment of the present invention will be explained in detail with reference to the attached drawings.

Figure 1:
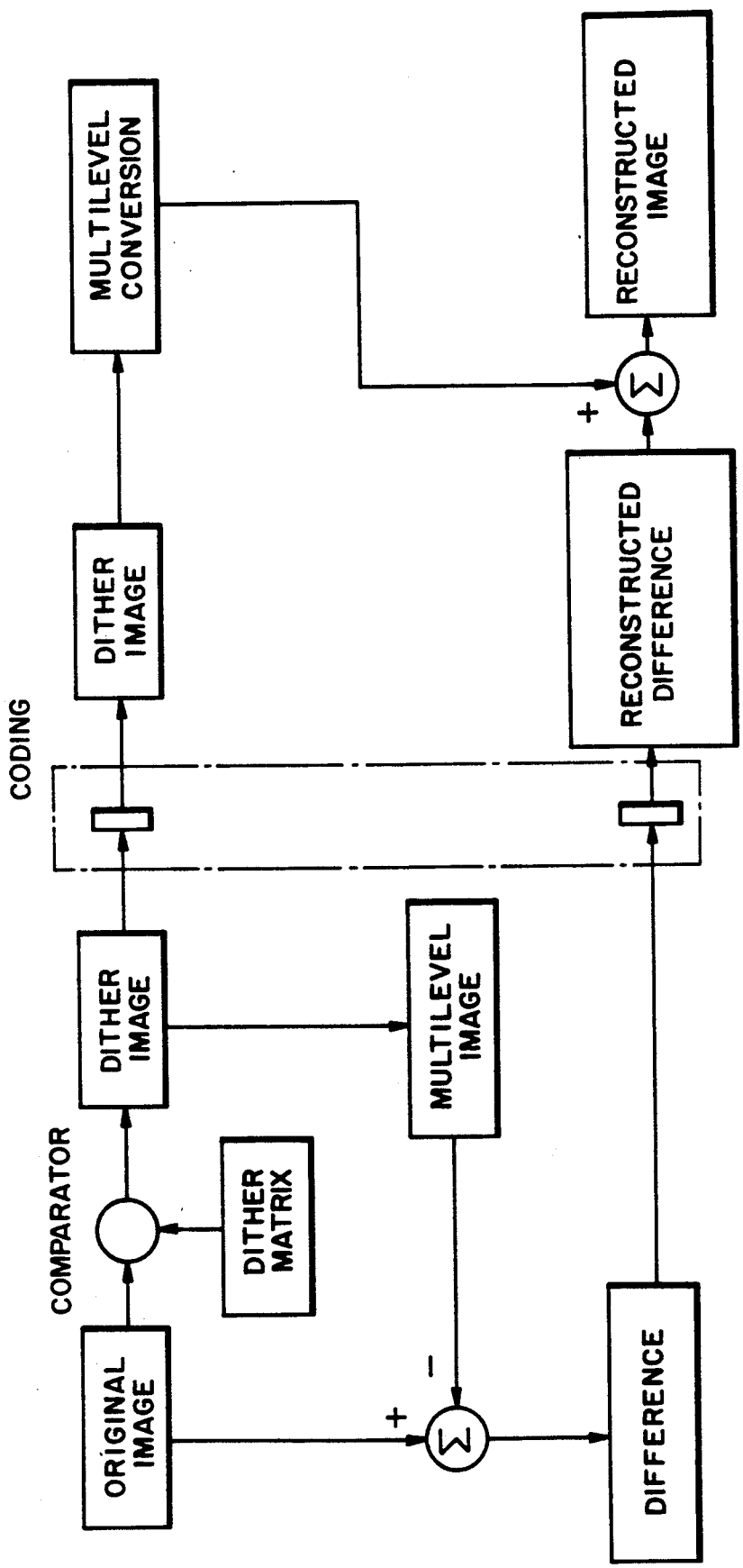
FIG. 1 is a system diagram showing step by step transmission of an image.

As shown in FIG. 1, an original image is dither-processed and transmitted step by step. In this dither process, a dither image is both transmitted and used to produce a multilevel image. From this multilevel image, a signal indicating the difference between the multivalue of the multilevel image and the original image is obtained, encoded and transmitted.

The original image can be reproduced at the receiving side by again converting the dither image to the multilevel image and adding the multivalue also transmitted to the converted multilevel image.

As is obvious, it is necessary to convert the dither image to a multilevel image at both the sending and receiving side.

There are several methods in dither image processing in which an original image is encoded into binary form. In the present invention, the dither image is processed by an independent decision method. The independent decision method uses a dither signal. White, (a "1" value), is indicated when a level of brightness of an original image is greater than that of the dither signal and black, (a "0" value), is indicated when the level of brightness of the original image is less than that of the dither signal. This method allows the original image to be transmitted with a small sized data signal when the image is dither processed and transmitted step by step. However, the dither signal alone only provides a rough representation of the actual image. Thus, the multilevel image is used to obtain a more accurate reproduction of the original image.

There are several algorithms for converting a dither image to a multilevel image.

The present invention uses the conversion method presented in "Conversion of Binary Image to Multilevel Image" introduced in "Shin Hak Kibo" in 1981, by Kato, Ota and Sita in Japan. As shown in FIG. 2, a 3 ×3 window is used which is subsequently divided into four subwindows as shown in FIG. 3.

The number of 1's in each subwindow is counted and then an average is obtained by dividing the sum by 4 for a 2×2 subwindow. This value is multipleid to a gain in the normalized condition and the result is a value of multilevel of a center pixel in a 3×3 window.

Various window sizes could be selected using this algorithm, however, a 3×3 window is utilized in the preferred embodiment due to its convenient hardware implementation.

A selection of a small window results in an image having good resolution since a multilevel assumption (process for determining the gray level of a center pixel according to the number of black or white pixels among its peripheral pixels) is effective when resolution (change of density) is high. However an image lacks tone when resolution is too high. As such, the selection of a large window, such as 9×9 window, would provide better tone but poorer resolution.

Therefore, where a change of density of an intermediate tonal image is fast, an assumptive image with a small window is preferred.

But where a change of density is slow, it is good to form pixels of an assumptive image by selecting a large window which will have good tone.

In the preferred embodiment, a multilevel assumption is achieved using a window of fixed size to facilitate hardware implementation. However, it should be noted that the hardware implementation for other sized windows is within the proper scope of the invention.

FIG. 3 illustrated various subwindows for a 3×3 array used in obtaining the multilevel image. The total number of 1's is achieved by counting and summing the number of 1's within subwindows (a), (b), (c), and (d). As described hereinafter, this can be implemented using a 16 to 5 1's counter. Thus, this method adds a 1 once when a 1 is input to scan areas 1, 3, 7 and 9 (octa-directional areas), adds a 1 twice when a 1 is input to scan areas 2, 4, 6 and 8, (tetra-directional areas) and adds a 1 four times when a 1 is input to scan area 5 (center of a window). When 1's are input into all the scan areas, 1's are added as shown in FIG. 4.

The nine elements of the 3×3 window may be counted a total of sixteen times if 1's are present in all 9 window elements.

Figure 5:
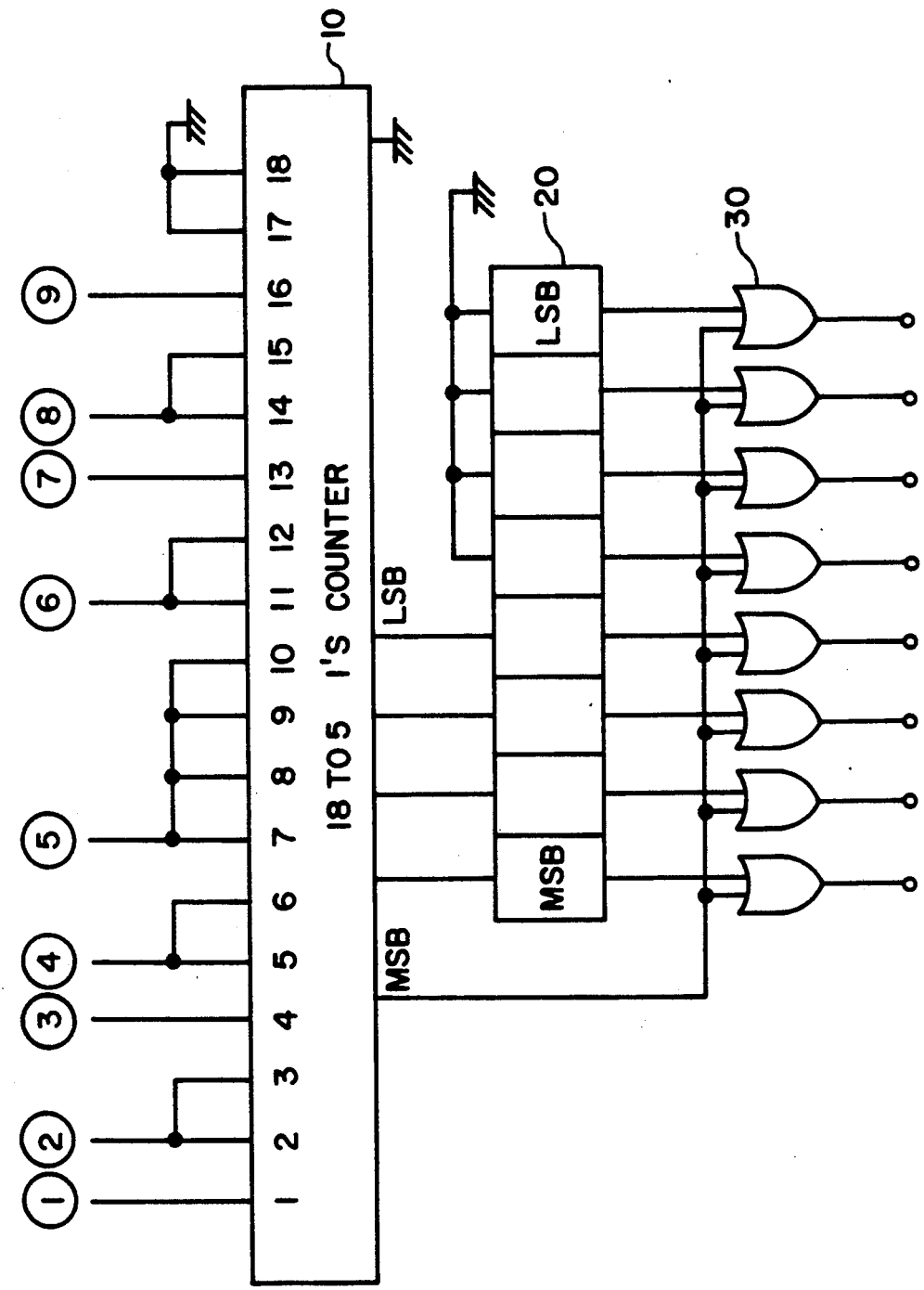
FIG. 5 shows a conversion circuit of binary dither image to multilevel image according to the present invention.

FIG. 5 illustrates a 1's counter 10 made up of a differential amplifier which functions as a neuron modified from the Hopfield model. Two of the inputs and one of the outputs to the 18 to 5 1's counter 10 are grounded and the 18 to 5 1's counter is used as a 16 to 5 1's counter. The counted value is multiplied by 16 by shifting the output from counter 10 to the left by 4 bits. This is accomplished by inputting the 4 LSBs output of counter 10 to the upper 4 bits of an 8 bit register 20 which has its lower 4 bits grounded. The MSB output from the counter 10 is not input into the register 20. Moreover, the MSB output from the counter 10 acts as the MSB of register 20, thereby allowing for nine bit values just as a carry bit would.

Each of the eight outputs of register 20 are connected to an input of 8 OR gates 30. The other input of these 8 OR gates 30 is connected to the MSB output of counter 10. Thus, the following output states from OR gates 30 are possible:

TABLE 1

| | | |
|---|---|---|
| 0 | 0000 0000 | 0 |
| 1 | 0001 0000 | 16 |
| 2 | 0010 0000 | 32 |
| 3 | 0011 0000 | 48 |
| 4 | 0100 0000 | 64 |
| 5 | 0101 0000 | 80 |
| 6 | 0110 0000 | 96 |
| 7 | 0111 0000 | 112 |
| 8 | 1000 0000 | 128 |
| 9 | 1001 0000 | 144 |
| 10 | 1010 0000 | 160 |
| 11 | 1011 0000 | 176 |
| 12 | 1100 0000 | 192 |
| 13 | 1101 0000 | 208 |
| 14 | 1110 0000 | 224 |
| 15 | 1111 0000 | 240 |
| 16 | 1111 1111 | 255 |

For example, if all 1's are input to all four subwindows, i.e. the inputs of a 3×3 window are all 1, then the output of counter 10 becomes 16, and, when multiplied by 16, (shifted four to the left), the value becomes 256. The MSB of the output of counter 10, connected to the input of the 8 OR gates 30, results in a value of 8 bit gray, "11111111", or decimal 255.

Figure 6:
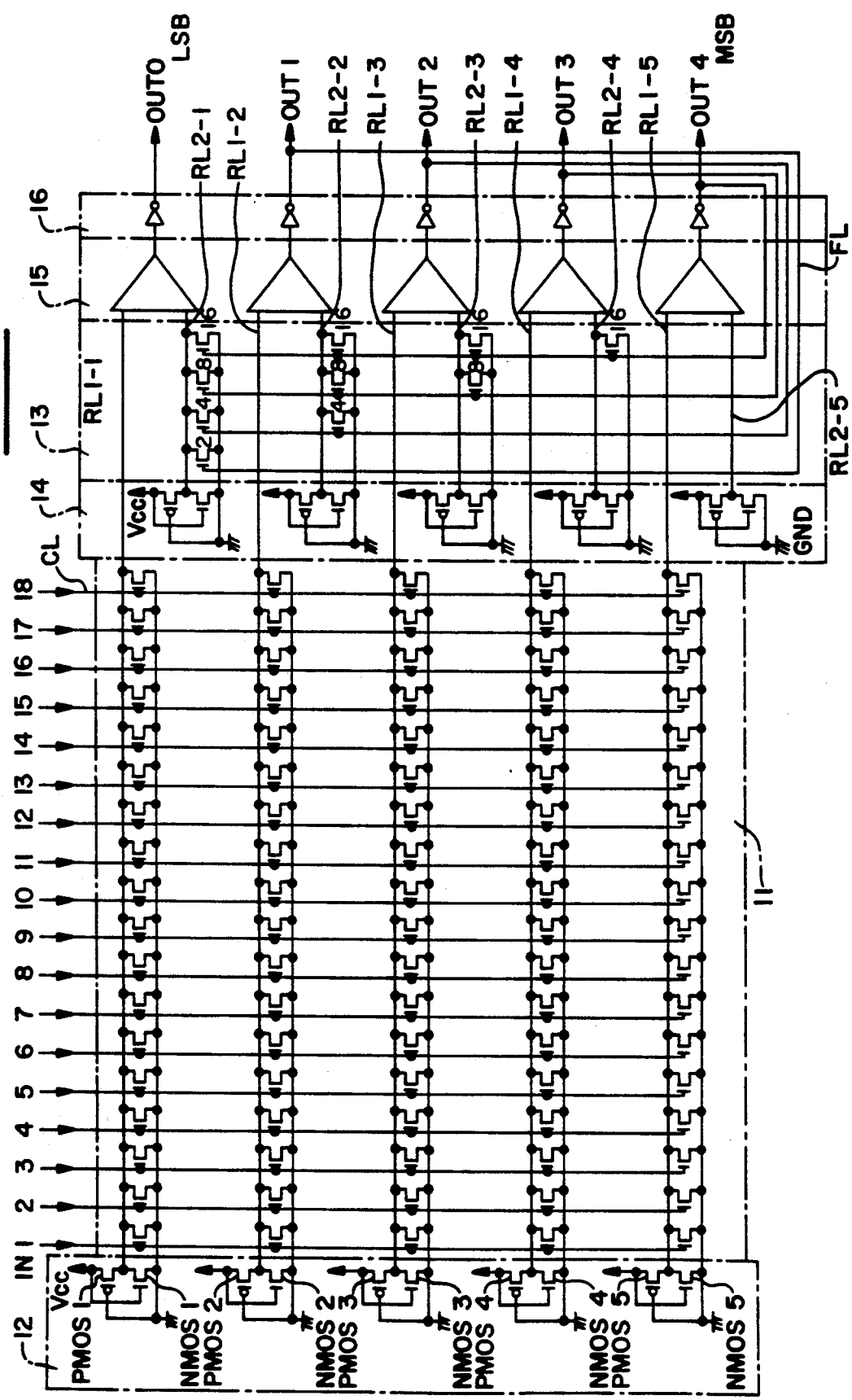
FIG. 6 is a circuit diagram showing an embodiment of a counter of FIG. 5.

FIG. 6 shows a counter 10 made up of an input synapse group 11, a first and a second bias synapse group 12 and 14, a feedback synapse group 13, a neuron group 15 and an invertor group 16, each of which will now be described.

The input synapse group 11 is composed of a plurality of substantially identical NMOS transistors, each of which establishes a conduction path to ground from the associated row line RL1 potential when the column line CL turns them on. Each of these input synapse NMOS transistors is effectively a current source and has a relative "connecting intensity" of 1. Therefore, each row line RL1 is biased with 18 column lines with a maximum combined connecting intensity to GND of 18.

By "connecting intensity" is meant the relative effect that the particular transistor has with respect to the other associated transistors in the circuit, and can also be viewed as the conductance of the transistor. This, as known in the art, is determined by the geometrical aspect ratio of the transistor using the channel width W to a channel length L (W/L) ratio of the PMOS and NMOS transistors.

Thus, when a column line CL input is "1", the associated transistor turns on. Five different transistors, one for each row line are activated when a column line goes to a 1 level.

The first bias synapse group 12 is responsible for biasing the row lines RL1-1 to RL1-5, depending upon the column line inputs. Associated with each row line RL1 is a PMOS transistor having a connecting intensity or relative conductance of 37, such as PMOS 1, and an NMOS transistor having a connecting intensity or relative conductance of 1, such as NMOS 1. The difference in relative intensities is 36, a multiple of 18, which is the number of column lines. This combination of transistors PMOS 1 and NMOS 1 biases the row line RL1 to a first power voltage Vcc.

In operation, for example, as more column lines are activated, more of the nmos transistors in the input synapse group 11 turn on. This causes more current to flow through each PMOS transistor in bias synapse group 12 and, therefore, the voltage on each row line to decrease in a stepwise fashion.

The second bias synapse group 14 is composed of a plurality of PMOS and NMOS transistors similar to the construction of the first bias synapse group 12 as described above. However each of 5 second row lines RL2-1 to RL2-5 is biased to the first power voltage Vcc by different connecting intensities.

In the preferred embodiment described, the specific relative connecting intensities, as determined by each set of pmos and nmos transistors for each row line RL2-1 to RL2-5, are 35.5, 34.5, 32.5, 28.5 and 20.5 for RL2-1 to RL2-5, respectively. It should be noted that the connecting intensity of row lines RL2-1 is 0.5 less than the connecting intensity of the first bias synapse for second row line RL2-1. This ensures that if 1 column line is "on", the connecting intensity of RL2-1 will be 35.5 and RL1-1 will be 35, resulting in setting the LSB output OUT 1 to a 1. The remaining second row lines are biased similarly to ensure that if 2, 4, 8 or 16 column lines are active, the corresponding second row lines RL2-2 to RL2-5 will be have a higher voltage than the corresponding first row line RL1 2 to RL1-5.

The feedback synapse group 13 is necessary to deactivate an undesired output when the number of column lines CL continues to increase. The feedback synapse group is composed of a plurality of NMOS transistors having a connecting intensity, weighting value, or relative conductance equal to the active upper output bits. The relative connecting intensity for each such transistor is written adjacent to that transistor in FIG. 6. When one of the output feedback lines FL1 FL4 is activated, the associated transistors turn on to properly bias the connected row lines RL2. Thus, if OUT 4 is 1 because 16 column lines are activated, the transistor having a connecting intensity of 16 turns on for each of the row lines RL2-1 to RL2-4 so that the outputs OUT0,-OUT3 are low, properly corresponding to a binary 16. The MSB of the second row line RL2-5 does not have any feedback transistors.

Thus, the feedback synapse group 13 ensures the correct binary value is output when provided the output of the input synapse group 11 and the second bias synapse group 14, by suppressing the appropriate LSBs. As another example, if 8 1's are input to column lines CL, the feedback synapse group ensures that OUT 0, OUT 1, and OUT 2 are 0 but OUT 3 remains a 1, providing the correct binary value.

The neuron group 15 is composed of 5 differential amplifiers, so that the potential difference between the associated row lines RL1 and RL2 are compared. When the value of the RL1 is larger than RL2, an active high state is output from the differential amplifiers, and when RL2 is larger than RL1, a ground state is output.

The invertor group 16 includes 5 invertors to invert the output of the respective differential amplifier circuits and supply this value to both the feedback lines FL and the output terminals.

The relationship of the input and output of the 1's counter 10 is shown as Table 2.

TABLE 2

| numbers of 1 | sum of RL1 connecting intensity | sum of RL2 connecting intensity | | | | | OUTPUT |
|---|---|---|---|---|---|---|---|
| | | MSB | *** | *** | *** | LSB | |
| 0 | 36 | 20.5 | 28.5 | 32.5 | 34.5 | 35.5 | 0 0 0 0 0 |
| 1 | 35 | 20.5 | 28.5 | 32.5 | 34.5 | 35.5 | 0 0 0 0 1 |
| 2 | 34 | 20.5' | 28.5 | 32.5 | 34.5 | 33.5 | 0 0 0 1 0 |
| 3 | 33 | 20.5 | 28.5 | 32.5 | 34.5 | 33.5 | 0 0 0 1 1 |
| 4 | 32 | 20.5 | 28.5 | 32.5 | 30.5 | 31.5 | 0 0 1 0 0 |
| 5 | 31 | 20.5 | 28.5 | 32.5 | 30.5 | 31.5 | 0 0 1 0 1 |

TABLE 2-continued

| numbers of 1 | sum of RL1 connecting intensity | sum of RL2 connecting intensity | | | | | OUTPUT |
|---|---|---|---|---|---|---|---|
| | | MSB | *** | *** | *** | LSB | |
| 6 | 30 | 20.5 | 28.5 | 32.5 | 30.5 | 29.5 | 0 0 1 1 0 |
| 7 | 29 | 20.5 | 28.5 | 32.5 | 30.5 | 29.5 | 0 0 1 1 1 |
| 8 | 28 | 20.5 | 28.5 | 24.5 | 26.5 | 27.5 | 0 1 0 0 0 |
| 9 | 27 | 20.5 | 28.5 | 24.5 | 26.5 | 27.5 | 0 1 0 0 1 |
| 10 | 26 | 20.5 | 28.5 | 24.5 | 26.5 | 25.5 | 0 1 0 1 0 |
| 11 | 25 | 20.5 | 28.5 | 24.5 | 26.5 | 25.5 | 0 1 0 1 1 |
| 12 | 24 | 20.5 | 28.5 | 24.5 | 22.5 | 23.5 | 0 1 1 0 0 |
| 13 | 23 | 20.5 | 28.5 | 24.5 | 22.5 | 23.5 | 0 1 1 0 1 |
| 14 | 22 | 20.5 | 28.5 | 24.5 | 22.5 | 21.5 | 0 1 1 1 0 |
| 15 | 21 | 20.5 | ·28.5 | 24.5 | 22.5 | 21.5 | 0 1 1 1 1 |
| 16 | 20 | 20.5 | 12.5 | 16.5 | 18.5 | 19.5 | 1 0 0 0 0 |

According to the present invention, as described above, a circuit for converting a binary dither image to multilevel image is described. This circuit uses a plurality of PMOS and NMOS transistors and neural network concepts in its hardware implementation to achieve high speed operation.

While a preferred embodiment of the present invention has been described and illustrated only for the 3×3 element window, the invention should not be limited thereto but may be otherwise embodied within the scope of the following claims.

What is claimed is:

1. An apparatus for converting a binary dither image having determined dither values of "0" and "1" derived from an original image segmented into a center pixel and peripheral pixels to a multilevel image comprising:
   counter means fabricated in electronic components for counting the number of dither values having a "1" state for said center and peripheral pixels to obtain a count output and a most significant bit output, said counter means including means for granting priority to said dither values of said center and peripheral pixels in a first predetermined manner and repeatedly counting those values in a second predetermined manner;
   normalizing means for normalizing said count output to obtain a normalized output; and
   summing means for logically summing said normalized output and said most significant bit output to obtain said multilevel image.

2. An apparatus according to claim 1 wherein said counter means is fabricated as an integrated circuit.

3. An apparatus according to claim 1 wherein said counter means comprises:
   first biasing means for biasing a plurality of first row lines to a first voltage;
   inputting means for altering said first voltage on each of said plurality of first row lines in accordance with an input state on a plurality of column lines, each of said column lines inputting one of said dither values;
   second biasing means for biasing a plurality of second row lines to a plurality of second voltages, each of said plurality of second voltages being different;
   comparator means for comparing each of said first row lines with one of said second row lines to obtain a plurality of output signals representing said count output and said MSB output; and
   feedback means for using said output signals to further control said value of said plurality of second voltages.

4. An apparatus according to claim 3 wherein said counter means includes a plurality of PMOS and NMOS transistors.

5. An apparatus according to claim 4 wherein a geometrical aspect ratio of said PMOS and NMOS transistors is varied.

6. An apparatus according to claim 4 wherein:

said first biasing means comprises a plurality of nmos and pmos transistor sets, each set connected in series between a reference voltage and a ground voltage and establishing said first voltage at a connecting node;

said inputting means comprises a plurality of nmos input transistors, each input transistor connected between said connecting node and said ground voltage and having a gate connected to one of said column lines so that when activated said first voltage is altered;

said second biasing means comprises a second plurality of NMOS and PMOS transistor sets, each second set connected in series between a reference voltage and a ground voltage and establishing said second voltages at second connecting nodes;

said comparator means compares the first altered voltage and second voltage for corresponding first and second connecting nodes; and said feedback means comprises nmos transistors connected to said second connecting nodes and controlled by said output signals.

7. An apparatus according to claim 6 wherein said comparator means comprises a differential amplifier.

8. An apparatus according to claim 1 wherein said normalizing means comprises a register and said summing means comprises a plurality of OR gates.

9. An apparatus for counting dither signals input on a plurality of column lines to obtain a count output used for obtaining a multilevel image comprising:

first biasing means for biasing a plurality of first row lines to a first voltage;

inputting means for altering said first voltage on each of said plurality of first row lines in accordance with an input state on said plurality of column lines, each of said column lines inputting one of said dither signals;

second biasing means for biasing a plurality of second row lines to a plurality of second voltages, each of said plurality of second voltages being different;

comparator means for comparing each of said first row lines with one of said second row lines to obtain a plurality of output signals representing said count output; and feedback means for using said output signals to further control said plurality of second voltages.

10. An apparatus according to claim 9 wherein:

said first biasing means comprises a plurality of nmos and pmos transistor sets, each set connected in series between a reference voltage and a ground voltage and establishing said first voltage at a connecting node;

said inputting means comprises a plurality of nmos input transistors, each input transistor connected between said connecting node and said ground voltage and having a gate connected to one of said column lines so that when activated said first voltage is altered;

said second biasing means comprises a second plurality of NMOS and PMOS transistor sets, each second set connected in series between a reference voltage and a ground voltage and establishing said second voltages at second connecting nodes;

said comparator means compares the first altered voltage and second voltage for corresponding first and second connecting nodes; and said feedback means comprises nmos transistors connected to said second connecting nodes and controlled by said output signals.

* * * * *